(12) United States Patent
Suzuki et al.

(10) Patent No.: US 6,390,639 B2
(45) Date of Patent: May 21, 2002

(54) SPREAD ILLUMINATING APPARATUS

(75) Inventors: Shingo Suzuki; Koichi Toyoda, both of Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/736,424

(22) Filed: Dec. 15, 2000

(30) Foreign Application Priority Data

Dec. 28, 1999 (JP) .............................. 11-375192

(51) Int. Cl.[7] ................................ F21V 7/18
(52) U.S. Cl. ..................... 362/31; 331/26; 331/551; 331/330; 331/320; 361/750
(58) Field of Search .................. 362/31, 551, 331, 362/330, 555, 278, 320; 174/254, 26; 361/749, 750, 751, 807, 715

(56) References Cited

U.S. PATENT DOCUMENTS 4,394,707 A * 7/1983 Consoli ...................... 361/750
5,103,375 A * 4/1992 Cottinggham ............... 361/715

* cited by examiner

Primary Examiner—Alan Cariaso
Assistant Examiner—Hargobind S. Sawhney
(74) Attorney, Agent, or Firm—Oliff & Berridge, PLC

(57) ABSTRACT

A cover portion 20 which covers a spot-like light source 8 is provided on the printed circuit board (FPC) 9, thereby giving electrical insulation from the surrounding. Therefore, even if a metallic frame is disposed close to the spot-like light source 8, the spot-like light source 8 is prevented surely from shortcircuiting with the metallic frame. Since the cover portion 20 covers the surrounding of the spot-like light source 8, light leakage from the spot-light like source 8 can be minimized and light emitted from the spot-like light source 8 can be used efficiently.

10 Claims, 6 Drawing Sheets

SPREAD ILLUMINATING APPARATUS

BACKGROUND OF THE INVENTION

1. Field of the Invention

This invention relates to a spread illuminating apparatus for use as an illuminating means in a signboard or various kinds of reflection type display apparatus, in particular, a liquid crystal display apparatus.

2. Related Art

A liquid crystal display apparatus is operated at a low electric consumption and characterized by its low profile and light weight, so its demand as a display apparatus mainly for computer has been increased. However, a liquid crystal as a constituent element of a liquid crystal display apparatus does not emit light by itself, and therefore needs an illuminating means to view a picture as opposed to a light emitting type element such as a picture tube. In particular, in a recent demand for a lower profile, a thin plate-like spread illuminating apparatus of side light type (light conductive member type) has been often used as an illuminating means for lighting a liquid crystal display apparatus.

One example of such side light type spread illuminating apparatus is shown in FIGS. 9 to 12.

In FIGS. 9 to 11, this spread illuminating apparatus 1 is formed in general with a transparent substrate 2 made of a transparent material and a longitudinal light source 4 disposed close to one side end face 3 of the transparent substrate 2. A liquid crystal panel 5 is disposed under the transparent substrate 2 and this spread illuminating apparatus 1 functions as an auxiliary illuminating device for the liquid crystal panel 5.

And, a box-like metal frame 6 is provided so as to enclose the spread illuminating apparatus and the liquid crystal panel 5.

The transparent substrate 2 is configured so-called wedge-like in section, in which the thickness becomes smaller as it gets away from the one side end 3.

The light source 4 is formed in general with a light conductive member 7 made from a longitudinally triangular plate of a transparent material and disposed close to and along the one side end face 3 of the transparent substrate 2 and a spot-like light source 8 disposed opposite to one end 7a of the light conductive member 7 and mounted on a flexible printed circuit board 9 (hereinafter referred to as "FPC").

Further, a surface 7c (second surface of the light conductive member) opposite to a surface 7b (first face of the light conductive member) facing the transparent substrate 2 is formed oblique relative to the first surface 7b of the light conductive member in a plan view. An optical path conversion means 10 which is formed with grooves 10a approximately triangular in section and plane portions 10b located between the grooves 10a is provided on the second surface 7c of the light conductive member. And, although the spot-like light source 8 is disposed at the one end 7a, light which enters the one end 7a of the light conductive member 7 is emitted uniformly from the first surface 7b of the light conductive member.

A light reflection pattern 12 is formed on one surface 11 (upper side in FIG. 11, hereinafter referred to as "upper face") of the transparent substrate 2, whereby the brightness is adapted to become approximately uniform at every portion of the transparent substrate 2 independent of the distance from the light conductive member 7.

The spot-like light source 8 is disposed on the FPC 9, and terminals 14 are connected to copper foils (conductive portion) 15. Portions lattice-hatched in FIG. 10 denote solder fillets 16.

In the prior art shown in FIGS. 9 to 11, the terminals 14, the solder fillets 16 and so on are disposed close to the metal frame 6, therefore a shortcircuit is apt to happen.

And, while it is demanded that light from the spot-like light source 8 enter the light conductive member 7 efficiently, in the above prior art, since the spot-like light source 8 is almost exposed, light L leaks outward from the circumference of the spot-like light source 8 as shown in FIG. 12, therefore the above demand has not been satisfied.

Further, the FPC 9 is required to be positioned suitably and not to come off at the time of assembling.

The present invention has been made in the light of the above problem and requirements and an object thereof is to provide a spread illuminating apparatus, in which a short-circuit can be prevented and light emitted from the spot-like light source can be used efficiently.

Another object of the present invention is to provide a spread illuminating apparatus, in which the FPC can be properly positioned and prevented from coming off.

According to a first aspect of the present invention, in a spread illuminating apparatus in which a rectangular light source is disposed close to a side end face of a transparent substrate made of a transparent material, the light source is formed with a bar-like light conductive member made of a transparent material and disposed along and close to at least one side end face of the transparent substrate and a spot-like light source disposed on at least one of both ends of the light conductive member and mounted on an FPC, wherein the FPC comprises a substrate on which the spot-like light source is mounted and a cover which extends from the substrate, covers the spot-like source and terminals disposed close to the spot-like light source and insulates electrically them from the surrounding.

According to a second aspect of the present invention, in the first aspect, the cover is formed with a bent extension from the substrate.

According to a third aspect of the present invention, in the first or second aspect, the cover comprises bend portions.

According to a fourth aspect of the present invention, in the second or third aspect, the cover comprises a reinforcing film on its inner surface clear of the bend portions.

According to a fifth aspect of the present invention, in the fourth aspect, the reinforcing film is formed of a material with a high thermal conductivity such as copper foil.

According to a sixth aspect of the present invention, in the fourth aspect, the reinforcing film has a low transparency.

According to a seventh aspect of the present invention, in any one of the second to sixth aspects, a cover coating is removed at the bend portions.

According to an eighth aspect of the present invention, in any one of the first to seventh aspects, a frame is provided which covers the light source and extends passing the one side end of the transparent substrate to overhang and fix the transparent substrate, a spot-like light source housing portion is provided at the end of the frame to house a spot-like light source disposing portion to dispose the spot-like light source in the FPC, and a positioning mechanism for determining the position of the FPC is provided at the spot-like light source disposing portion.

According to a ninth aspect of the present invention, in any one of the first to seventh aspects, a frame is provided which covers the light source and extends passing the one side end of the transparent substrate to fix the transparent substrate, a spot-like light source housing portion is provided at the end of the frame to house the spot-like light disposing portion to dispose the spot-like light source in the FPC, and a mechanism for preventing the FPC from coming off from the spot-like light source housing portion is provided at the spot-like light source disposing portion.

According to a tenth aspect of the present invention, in any one of the first to seventh aspects, a frame is provided which covers the light source and extends passing the one side end of the transparent substrate to fix the transparent substrate, a spot-like light source housing portion is provided at the end of the frame to house the spot-like light disposing portion to dispose the spot-like light source in the FPC, and an integrated mechanism for positioning the FPC and at the same time preventing the FPC from coming off from the spot-like light source housing portion is provided at the spot-like light source disposing portion.

EMBODIMENT

Figure 1:
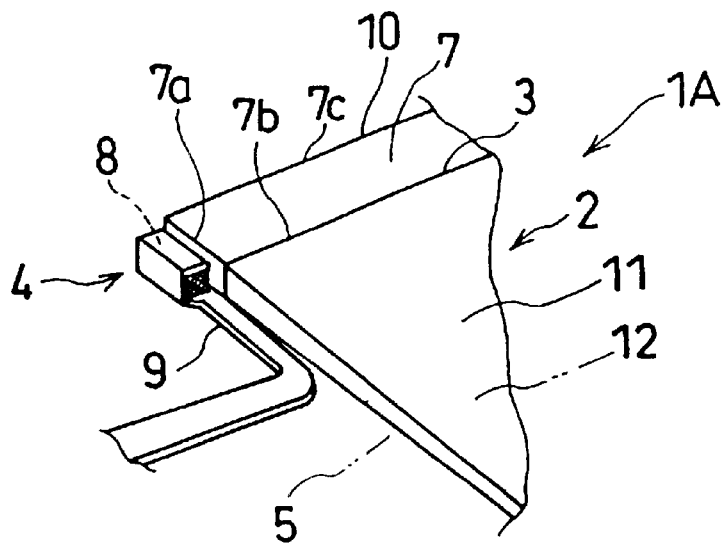
FIG. 1 is a perspective view showing schematically the spread illuminating apparatus of the first embodiment of the present invention.

Hereinafter, a spread illuminating apparatus 1A of a first embodiment of the present invention will be explained with reference to FIGS. 1 to 3. FIGS. 9 to 12 and others share common denotations for equivalent portions and members, and explanations thereof are omitted.

The spread illuminating apparatus 1A comprises, in general, a transparent substrate 2 made of a transparent material, and a rectangular light source 4 disposed close to one side end face 3 of the transparent substrate 2. The spread illuminating apparatus 1A is used as an auxiliary illuminating device for a liquid crystal panel 5 which is disposed over the bottom surface the transparent substrate 2.

The transparent substrate 2 is formed so-called wedge-like in section, that is, in such a manner that its thickness becomes gradually smaller as it gets away from the one side end face 3.

Figure 4:
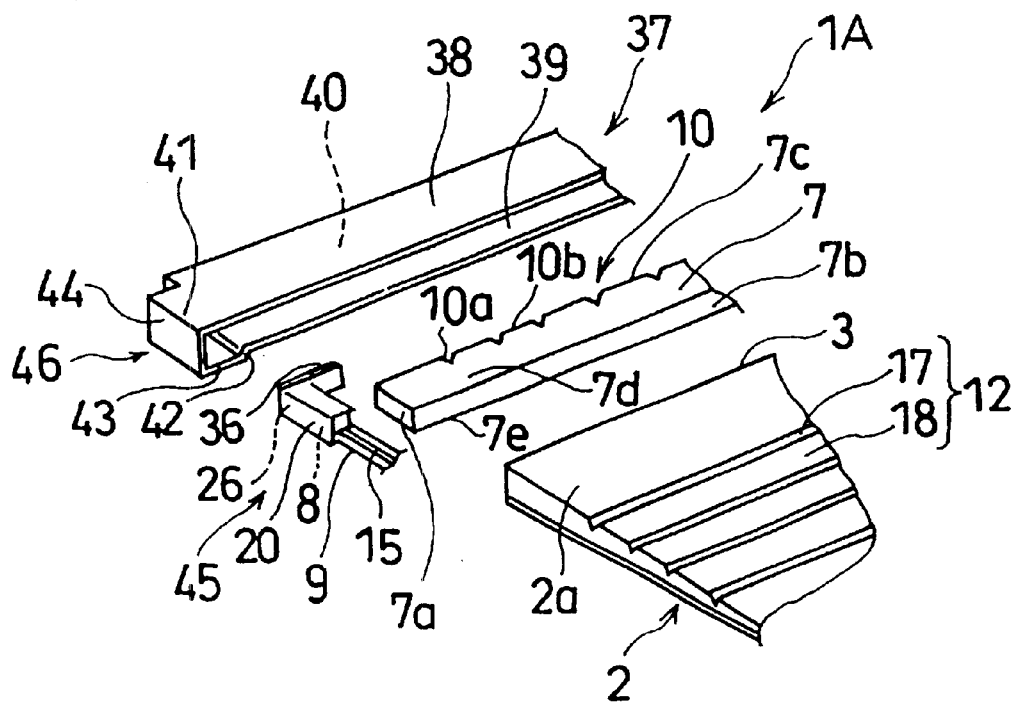
FIG. 4 is an exploded perspective view showing the spread illuminating apparatus of the second embodiment.
Figure 5:
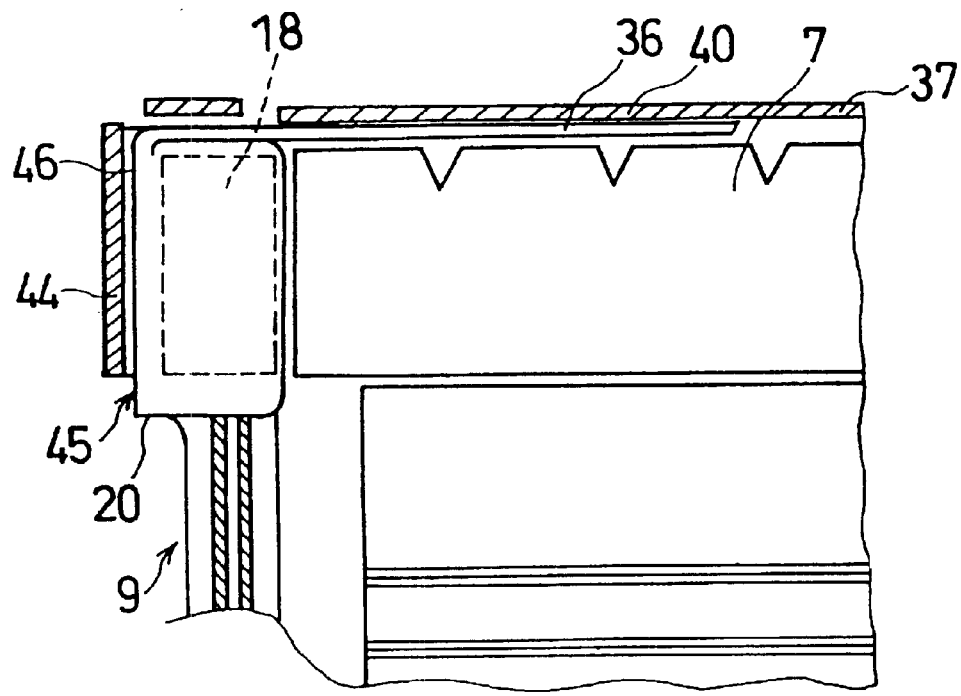
FIG. 5 is a sectional view showing the spread illuminating apparatus of FIG. 4.
Figure 6:
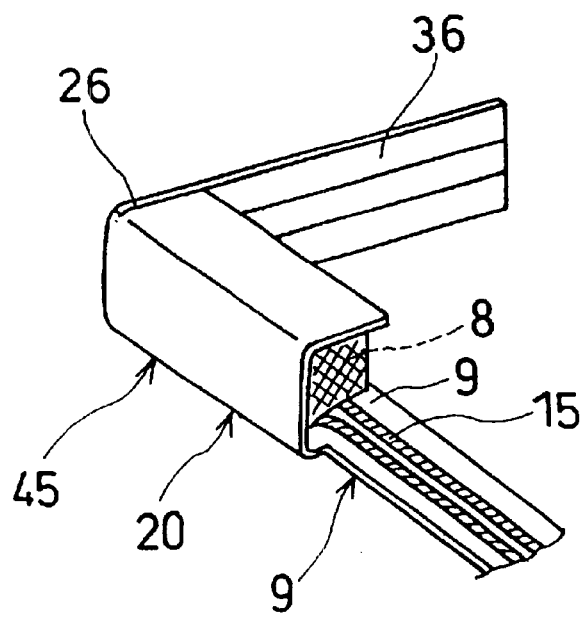
FIG. 6 is a perspective view showing the cover portion and extension portion of FIG. 4.

A light reflection pattern 12 (see FIG. 4) is formed on one surface 11 (upper side in FIG. 1, hereinafter referred to as "upper face") of the transparent substrate 2. The light reflection pattern 12 is formed with a plurality of grooves 17 approximately triangular in section and plane portions 18 adjacent to each of the grooves 17. And, the ratio of the width (occupied area) of the groove 17 to the width (occupied area) of the plane portion 18 is set to become gradually larger as it gets away far from the one side end face 3 of the transparent substrate 2 so as to make brightness approximately uniform at every portion of the transparent substrate 2 independent of the distance from a light conductive member 7.

The groove 17 of the light reflection pattern 12 formed on the transparent substrate 2 is quite fine, so that it can not be visually recognized on a screen.

The light source 4 is formed in general with the long plate-like light conductive member 7 made of a transparent material and disposed close to the side end face 3 of the transparent substrate 2 and a spot-like light source 8 composed of a light emitting diode, disposed facing one end of the light conductive member 7 and mounted on an FPC 9.

An optical path conversion means 10 is provided on a face 7c (second face of the light conductive member 7) opposite to a face 7b (first face of the light conductive member 7) facing the transparent substrate 2, and light which enters one end 7a of the light conductive member 7 is emitted approximately uniformly from the first face 7b of the light conductive member 7, although the spot-like light source 8 is disposed at the one end 7a.

The FPC 9 is formed in general with a rectangular board 19 (substrate) on which the spot-like light source 8 is mounted and a cover portion 20 which extends from the substrate 19 and covers the spot-like light source 8 and a terminal 14 to electrically insulate them from the surrounding.

The cover portion 20 generally comprises a rectangular face portion 22 (first face) being bent (hereinafter referred to as "bend portion 21" adjoining the substrate) normal to the substrate 19 and connecting therewith, a rectangular face portion 24 (second face) being bent (hereinafter referred to as "first bend portion 23 of the cover portion") normal to the first face 22, connecting therewith in parallel with the substrate 19, and a rectangular face portion 26 (third face) being bent (hereinafter referred to as "second bend portion 25 in the cover portion") and extending from the first face 22 in a direction normal to the first bend portion 23 of the cover portion.

The spot-like light source 8 mounted on the substrate 19 is housed in a space portion 27 formed by the substrate 19, the first, second and third faces 22, 24 and 26. The space portion 27 includes an opening (hereinafter referred to as "first open portion 28") at the side opposing the first face 22, and the spot-like light source 8 and the FPC 9 are disposed in such a manner that the first open portion 28 faces the one end 7a of the light conductive member 7 whereby light from the spot-like light source 8 enters the light conductive member 7. For reference, an opening opposing the third face 26 of the cover portion 20 is referred to as second open portion 29.

Figure 2:
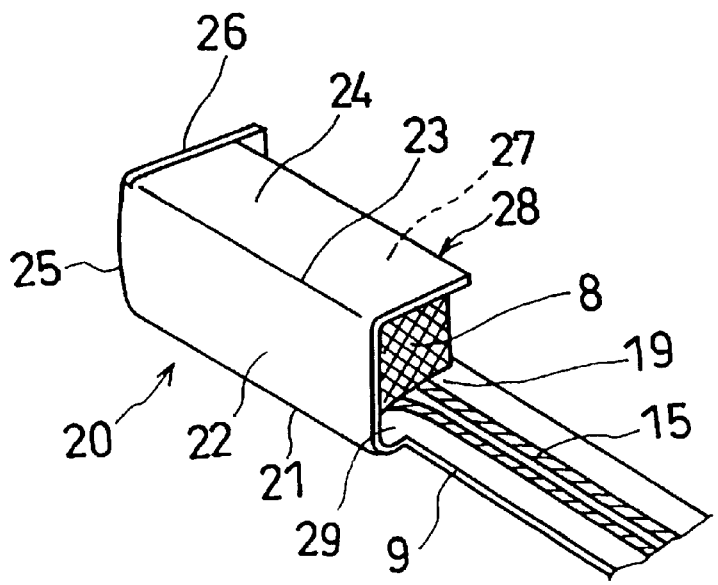
FIG. 2 is a perspective view showing the FPC of FIG. 1 and the cover portion.
Figure 3:
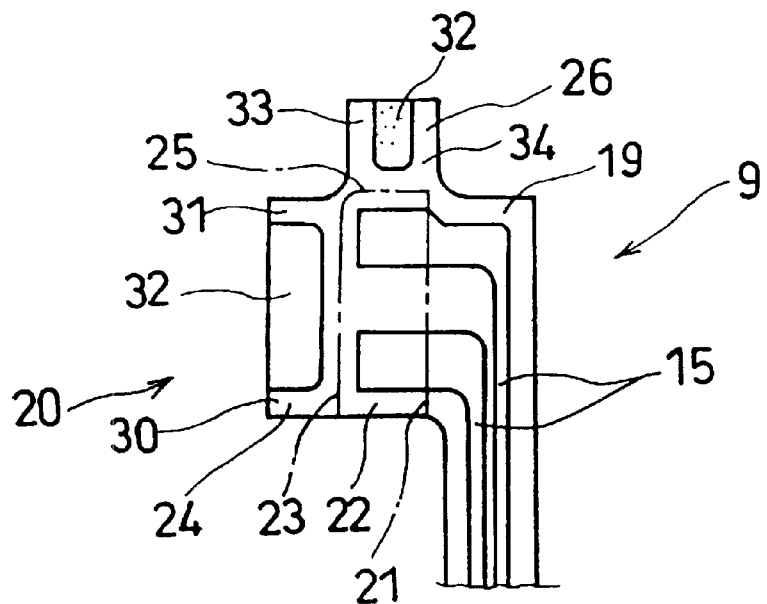
FIG. 3 is a developed view showing the state of the cover portion of FIG. 1 before it is bent.

In FIGS. 2 and 3, numeral 15 denotes a copper foil provided on the FPC 9.

In this embodiment, the copper foil 15 extends from the substrate 19 to the first face 22 and the copper foil 15 of the first face 22 is connected to the terminal 14.

The second face 24 includes an approximately rectangular reinforcing copper foil 32 (reinforcing film, dummy pattern)

on its inner surface(surface facing space portion 27) except the area of the first bend portion 23 of the cover portion and edge portions 30, 31 running normal to the second bend portion 25 of the cover portion.

Further, the third face 26, as well as the second face 24, includes the approximately rectangular reinforcing copper foil 32 (reinforcing film, dummy pattern) on its inner surface (surface facing space portion 27) except the areas of the second bend portion 25 of the cover portion and edge portions 33, 34 running normal to the second bend portion 25 of the cover portion.

Further, the cover coating (not denoted) is removed at the bend portion 21 adjoining the substrate and the first and second bend portions 23 and 25 of the cover portion.

In the first embodiment thus formed, because the cover portion 20 covers the spot-like light source 8 and the terminal 14 thereof and insulates electrically them from the surrounding, the above components (the spot-like light source 8 and the terminal 14) and a solder fillet 16 can be surely prevented from being shortcircuited with a metal frame 6 (see FIG. 10) even if the metal frame 6 is disposed close to the spot-like light source 8.

Further, since the cover portion 20 covers the surrounding of the spot-like light source 8, light leakage from the spot-like light source 8 can be minimized, which contributes to an effective use of light emitted from the spot-like light source 8.

The second face 24 and the third face 26 are provided with the reinforcing copper foil 32, therefore gain a given rigidity and can be easily bent at the first bend portion 23 and the second bend portion 25 of the cover portion 20, thereby enhancing workability and assembling precision. In this case, since the cover coating is removed at the first and second bend portions 23 and 25 of the cover portion, the rigidity of the first and second bend portions 23 and 25 of the cover portion 20 is decreased, thereby making the bending work easier, which further enhances the workability and assembling precision.

The thermal conductivity of the second and third faces 24 and 26 is increased due to the provision of the reinforcing copper foil 32, thereby improving the heat radiation, and as a result temperature rise in the space is prevented and the specifications of the spot-like light source 8, etc. can be eased.

Further, since the reinforcing copper foil 32 is provided on the second and third faces 24 and 26, light can be reflected more efficiently, which, in combination with the prevention of light leakage due to the presence on the second and the third faces 24 and 26 (cover portion 20), enables light from the spot-like light source 8 to enter the light conductive member 7 efficiently, and to be used further efficiently.

In the above first embodiment, the reinforcing film is of the copper foil (reinforcing copper foil 32) but may alternately be of any other materials that have a high thermal conductivity. Still further, in the first embodiment, the reinforcing film is of the copper foil (reinforcing copper foil 32) with a low transparency but may alternately be of any other material with a low transparency.

Next a second embodiment of the present invention is explained with reference to FIGS. 4 to 8 and further in the light of FIGS. 1 to 3 and 12.

The second embodiment is different from the first embodiment mainly in that it has a frame 37 whose construction is described herein later and an extension portion 36 (an integrated mechanism for determining position and preventing pull-out) extending from the third face 26 of the cover portion 20. And in this second embodiment, a rectangular long plate-like light conductive member 7 is provided in place of the triangular long plate-like light conductive member 7 of the first embodiment, but the triangular long plate-like light conductive member may be used in place of the rectangular long plate-like light conductive member 7.

An optical path conversion means 10 is provided on a face of the light conductive member 7 (second face 7c of light conductive member) opposite to a face (first face 7b of the light conductive member) facing the transparent substrate 2. The optical path conversion means 10 is formed with grooves 10a approximately triangular in section and plane portions 10b formed between the grooves 10a.

The light traveling in the light conductive member 7 and reflected on the second face 7c of the light conductive member, in the case where the light is reflected on the groove 10a, is adapted to travel approximately normal to the first face 7b of the light conductive member due to an inclined face (not shown) forming the groove 10a, and a larger amount of light travels through the first face 7b of the light conductive member 7 and enters the transparent substrate 2 compared with the case where the light is reflected on the plane portion 10b. Accordingly, the ratio of the width (occupied area) of the groove 10a to the width (occupied area) of the plane portion 10b is set to become gradually larger as it gets away far from the one end 7a of the light conductive member 7. In this case, the balance between the distance from the spot-like light source 8 and the occupied area of the groove 10a is considered so that light is emitted uniformly at the first face 7b of the light conductive member even if the spot-like light source 8 is disposed on the one end 7a.

As described above, the optical path conversion means 10 of the present embodiment is formed in such a manner that while the interval (pitch) between one groove 10a and another groove 10a adjacent thereto is kept constant, the cut depth of the groove 10a is set to become gradually larger as it gets away far from the spot-like light source 8 in order to change the ratio of the occupied areas between the groove 10a and the plane portion 10b. For reference, the ratio of the occupied areas between the groove 10a and the plane portion 10b may be changed by gradually narrowing the interval (pitch) between the grooves 10a while the cut depth of the groove 10a is kept constant.

The frame 37 made of a metal having a shape of C-letter section is provided, which covers the longitudinal circumferential faces of the light conductive member 7 except the first face 7b [the second face 7c and two faces (third face 7d and the fourth face 7e of the light conductive member) oriented normal to the first and second faces 7b, 7c and connecting therewith] and extends to a portion 2a positioned toward one side end face 3 of the transparent substrate 2 (hereinafter referred to as "proximal portion of the transparent substrate").

The frame 37 is formed in general with opposing plates which face the third face 7d and the fourth face 7e of the light conductive member 7 respectively (hereinafter one opposing plate facing the third face 7d of the light conductive member is referred to as "first opposing plate 38" and the other opposing plate facing the fourth face 7e of the light conductive member as "second opposing plate 39", respectively), and a frame base 40 oriented approximately normal to the first and second opposing plates 38 and 39 and connecting therewith. The distance from the first opposing plate 38 to the second opposing plate 39 is set a little larger than the height of the third face 26 of the cover portion 20.

The first opposing plate 38 extends toward one end of the frame 37 (hereinafter referred to as "first extension 41"), the second opposing plate 39 extends toward the one end of the frame 37 through a step portion 42 (hereinafter referred to as "second extension 43") and the tips of the first and second extensions 41 and 43 are connected with an end plate 44. The first and second extensions 41, 43 and the end plate 44 are adapted to house a portion 45 (spot-like light source disposing portion) comprising the substrate 19 and the cover portion 20 of the FPC 9, thereby constituting a spot-like light source housing portion 46.

The third face 26 of the cover portion 20 extends to form an extension 36. The extension 36 is to be inserted between the frame base 40 and the light conductive member 7 when the portion 45 is housed in the spot-like light source housing portion 46 and assembled thereto.

In the second embodiment thus structured, even if a force making the portion 45 to pull out from the frame 37 is applied to the FPC 9, the extention 36 of the third face 26 is hooked by the light conductive member 7, whereby the FPC 9 is surely prevented from pulling out.

Now, such a preventive means for stopping the FPC 9's pulling out can be realized even if the height of the extension 36 is made smaller (for instance, configured as a shaft).

Figure 7:
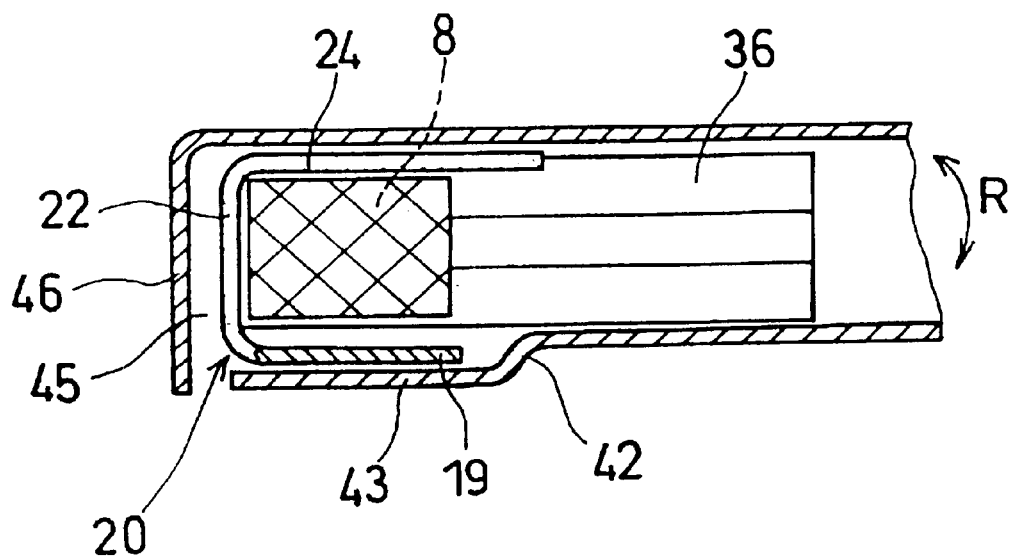
FIG. 7 is a sectional view showing the cover portion and the extension portion of FIG. 4.
Figure 8:
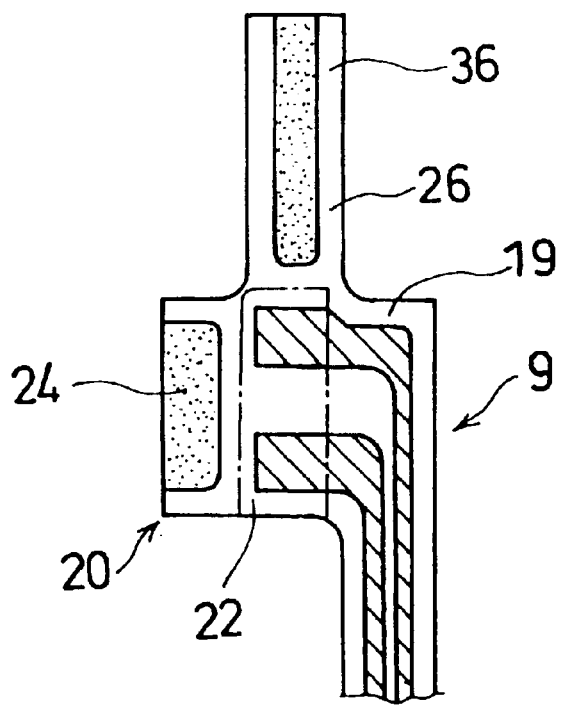
FIG. 8 is a developed view showing the state of the cover portion of FIG. 4 before it is bent.
Figure 9:
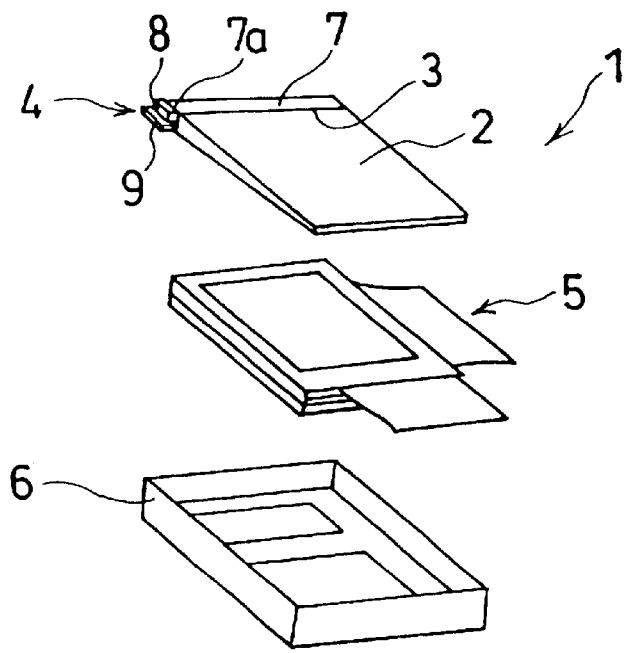
FIG. 9 is an exploded perspective view showing an example of a conventional spread illuminating apparatus.
Figure 10:
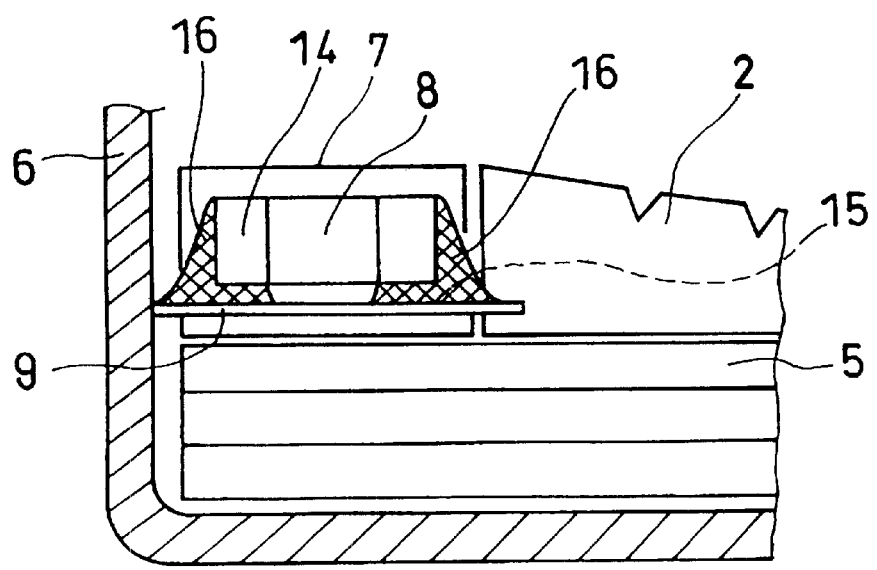
FIG. 10 is a sectional view showing schematically how the spot-like light source, etc. are disposed relative to the FPC of FIG. 9.
Figure 11:
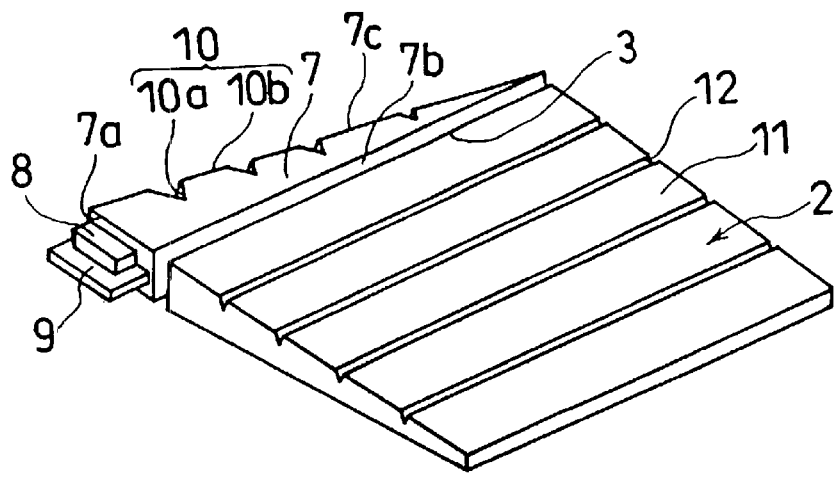
FIG. 11 is a perspective view showing the spread illuminating apparatus of FIG. 9.
Figure 12:
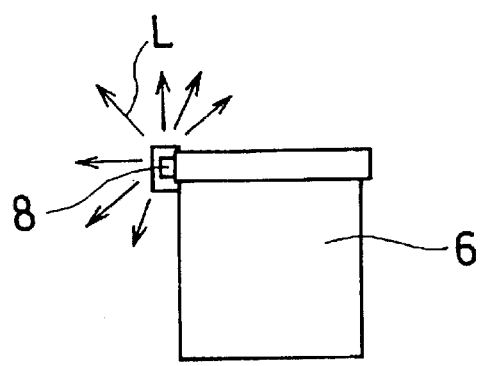
FIG. 12 is a view showing schematically how light leaks in the spread illuminating apparatus of FIG. 9.

On the other hand, the distance from the first opposing plate 38 to the second opposing plate 39 is set a little larger than the height of the extension 36 (the third face 26), and as a result the gap between the first opposing plate 38 and the extension 36 and the gap between the second opposing plate 39 and the extension 36 are small, therefore, the FPC is prevented from moving in the direction R as shown in FIG. 7, which enables the FPC 9 to be positioned easily and surely.

Figure 13:
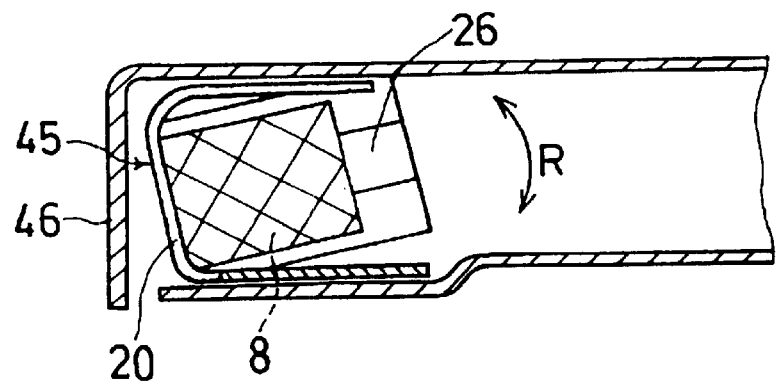
FIG. 13 is a sectional view explaining the effect of the second embodiment of FIG. 4.

That is, as shown in FIG. 13, in the case where the extension 36 is not provided on the third face 26, since the spot-like light source housing portion 46 is provided with a margin for letting in the FPC 9, it can happen that the FPC 9 shakes in the direction R indicated by an arrow, making it difficult to proerly position the FPC.

However, according to the second embodiment of the present invention, such a problem (shaking of the FPC 9) as seen in the case shown by the FIG. 13 is not caused and the FPC can be positioned easily and surely as described above.

And, the positioning of the FPC 9 as mentioned above can be realized, for instance, by providing an extension (not shown) like the extension 36 on the second face 24.

Further, in the second embodiment, since both of the above mentioned functions of positioning the FPC and preventing the FPC from pulling out are carried out by one extension 36, the structure can be simpler, and the assembliability and productivity can be better than in the case where individual member is used for each function.

In the above embodiment, the frame 3 itself has a light reflecting function, but the frame may be provided with a separate light reflection member having a light reflecting function.

The material of the light conductive member 7 has only to transmit light efficiently, and from the viewpoint of light transmittance and workability an acrylic resin is most preferable. For reference, in place of that, various kinds of thermoplastic resins such as vinyl chloride, polycarbonate resin, olefin resin and styrene resin can be used. Further, a thermostatic transparent resin such as epoxy resin, allyldiglicollic carbonate resin, and an inorganic transparent material such as various glass materials or the like may be applicable depending on the case.

For producing the light conductive member 7, direct machining work such as cutting, grinding and the like, or various kinds of molding methods such as casting molding, thermal pressure molding, protrusion molding, injection molding and the like can be used. However, from the viewpoint of productivity, the injection molding method using resin is most preferable.

According to the first to the seventh aspects of the present invention, since the cover portion electrically insulates the electric conductive parts in the cover portion from the surrounding, a shortcircuit can be surely prevented even if a metallic frame, etc. is disposed close to the FPC.

According to the eighth aspect of the present invention, a positioning means is provided at a spot-like light source disposing portion of the FPC, therefore the FPC can be positioned easily, and at the same time the number of parts can be reduced thereby simplifying the structure as compared with the case where separate parts are used as a positioning mechanism.

According to the ninth aspect of the present invention, since a preventive mechanism against the FPC's pulling out is provided at the spot-like light source disposing portion of the FPC, the pulling out of the FPC can be prevented easily, and at the same time the number of parts can be reduced thereby simplifying the structure as compared with the case where separate parts are used as a preventive mechanism against the FPC's pulling out.

According to the tenth aspect of the present invention, since a positioning mechanism and a preventive mechanism against the FPC's pulling out are provided integrally at the spot-like light disposing portion of the FPC whereby the function of preventing the FPC's pulling out and the function of positioning the FPC are carried out with one common member, the number of parts are further reduced thereby enabling the structure to be further simplified.

What is claimed is:

1. A spread illuminating apparatus having a rectangular light source disposed close to a side end face of a transparent substrate made of a transparent material, wherein said light source is formed with: a bar-like conductive member made of a transparent material and disposed along and close to at least one side end face of said transparent substrate; and a spot-like light source disposed at at least one of both ends of said light conductive member and mounted on a flexible printed circuit board, and wherein said flexible printed circuit board comprises: a substrate having said spot-like light source mounted thereon; and a cover portion extending from said substrate to cover said spot-like light source and terminals near said spot-like light source thereby electrically insulating those from the surrounding.

2. The spread illuminating apparatus according to claim 1, wherein said cover portion is provided by bending an extension from said substrate.

3. The spread illuminating apparatus according to claim 2, wherein said cover portion has a reinforcing film on its inner surface clear of said bend portions.

4. The spread illuminating apparatus according to claim 3, wherein said reinforcing film is of a material high in thermal conductivity such as copper foil.

5. The spread illuminating apparatus according to claim 3, wherein said reinforcing film is of a material low in transparency.

6. The spread illuminating apparatus according to claim 2, wherein a cover coating is removed at said bend portions.

7. The spread illuminating apparatus according to claim 1, wherein said cover portion comprises bend portions.

8. The spread illuminating apparatus according to claim 1, wherein a frame is provided which covers said light source and extends past one side end of said transparent substrate to overhang and fix said transparent substrate, a spot-like light source housing portion is provided at the end of said frame so as to house a spot-like light source disposing portion adapted to dispose said spot-like source of said flexible printed circuit board, and wherein a positioning mechanism is provided on said spot-like light source disposing portion to position said flexible printed circuit board.

9. The spread illuminating apparatus according to claim 1, wherein a frame is provided which covers said light source and extends past one side end of said transparent substrate to overhang and fix said transparent substrate, a spot-like light source housing portion is provided at the end of said frame so as to house a spot-like light source disposing portion adapted to dispose said spot-like light source of said flexible printed circuit board, and wherein a preventive mechanism is provided on said spot-like light source disposing portion so as to prevent said flexible printed circuit board from pulling out from said spot-like light source housing portion.

10. The spread illuminating apparatus according to claim 1, wherein a frame is provided which covers said light source and extends past one end of said transparent substrate to overhang and fix said transparent substrate, a spot-like light source housing portion is provided at the end of said frame so as to house a spot-like light source disposing portion adapted to dispose said spot-like light source of said flexible printed circuit board, and wherein an integrated mechanism is provided on said spot-like light source disposing portion so as to position said flexible printed circuit board and the same time to prevent said flexible printed circuit board form pulling out from said spot-like light source housing portion.

* * * * *